United States Patent
Haas et al.

(10) Patent No.: US 9,419,537 B1
(45) Date of Patent: Aug. 16, 2016

(54) LIGHT EMITTING DIODE (LED) DRIVER HAVING DIRECT REPLACEMENT CAPABILITIES

(71) Applicants: Daniel Albert Haas, Rootstown, OH (US); Timothy Chen, Aurora, OH (US)

(72) Inventors: Daniel Albert Haas, Rootstown, OH (US); Timothy Chen, Aurora, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 0 days.

(21) Appl. No.: 14/608,335

(22) Filed: Jan. 29, 2015

(51) Int. Cl.
*H05B 37/02* (2006.01)
*H02M 7/06* (2006.01)
*H05B 33/08* (2006.01)

(52) U.S. Cl.
CPC ............. *H02M 7/06* (2013.01); *H05B 33/0815* (2013.01); *H05B 37/02* (2013.01)

(58) Field of Classification Search
CPC ......... H05B 33/08; H05B 37/02; H05B 41/14
USPC ...... 315/200 R, 291, 294, 297, 307, 308, 312
See application file for complete search history.

(56) References Cited

U.S. PATENT DOCUMENTS

| 6,739,734 | B1 | 5/2004 | Hulgan |
| 8,299,711 | B2 | 10/2012 | Chang |
| 2003/0016546 | A1* | 1/2003 | Tolle ............... H02M 3/337 363/37 |
| 2013/0320869 | A1* | 12/2013 | Jans ............... H05B 33/0803 315/186 |
| 2015/0001956 | A1* | 1/2015 | Saen ............... H04B 5/0037 307/104 |
| 2015/0062987 | A1* | 3/2015 | Chen ............... H02M 1/32 363/89 |
| 2015/0289341 | A1* | 10/2015 | Hong ............... H05B 33/0812 315/122 |

OTHER PUBLICATIONS

PCT, International Search Report and Written Opinion, International Application No. PCT/US2016/013842 (Mar. 21, 2016).

* cited by examiner

*Primary Examiner* — Tung X Le
(74) *Attorney, Agent, or Firm* — Thompson Hine LLP

(57) ABSTRACT

A driver circuit for powering a load is disclosed. The driver circuit includes an input for connection to a ballast, a rectifier, a switch, and a fault circuit. The rectifier converts AC power received from the input into DC power. The rectifier includes a rectifier input. The switch is electrically connected to the rectifier input. The switch is activated to create a short circuit at the rectifier inputs in response to receiving an activation signal. The fault circuit is electrically connected to the switch. The fault circuit generates the activation signal in response to detecting at least one of an over voltage, an over temperature, and an over current condition of the driver circuit.

25 Claims, 7 Drawing Sheets

LIGHT EMITTING DIODE (LED) DRIVER HAVING DIRECT REPLACEMENT CAPABILITIES

TECHNICAL FIELD

The present disclosure relates generally to a driver circuit for powering a load, and more particularly to a driver circuit connectable to a fluorescent ballast including over current, over temperature, and over voltage protection.

BACKGROUND

Light emitting diode (LED) based lighting systems may offer several energy and reliability advantages over other types of lighting systems such as, for example, incandescent or fluorescent lighting. Thus, LED based lighting systems may be used to replace other existing lighting technologies. Fluorescent tube lighting has historically been a significant source of illumination in many applications, particularly in commercial markets, for a number of reasons. However, fluorescent lights are typically unable to run directly from alternating current (AC). To make fluorescent lighting practical and relatively easy to use, a ballast may be placed between AC mains power and a fluorescent tube light in order to control and regulate the voltage, current and power.

Conversion from fluorescent tube lighting to newer technologies, such as LED based lighting systems, may become costly due to characteristics that are fundamentally associated with fluorescent lighting. In particular, conversion from fluorescent tube lighting to LED tube lighting usually requires the fluorescent tube light and as well as the ballast used to control power to the fluorescent tube light to be removed first. Then the LED tube light, which does not typically require a ballast, is subsequently installed. Some individuals may find it cumbersome and time consuming to remove the ballast first before the LED tube light may be installed. Accordingly, there is a continuing need in the art for an more efficient approach to retrofit fluorescent tube lighting with LED tube lighting.

SUMMARY

In one embodiment, a driver circuit for powering a load is disclosed. The driver circuit includes an input for connection to a ballast, a rectifier, a switch, and a fault circuit. The rectifier converts AC power received from the input into DC power. The rectifier includes a rectifier input. The switch is electrically connected to the rectifier input. The switch is activated to create a short circuit at the rectifier inputs in response to receiving an activation signal. The fault circuit is electrically connected to the switch. The fault circuit generates the activation signal in response to detecting at least one of an over voltage, an over temperature, and an over current condition of the driver circuit.

In another embodiment, a driver circuit for powering a load is disclosed. The driver circuit includes an input for connection to a ballast, a rectifier, a switch, a fault circuit, and a charge pump circuit. The rectifier converts AC power received from the input into DC power. The rectifier includes a rectifier input. The switch is electrically connected to the rectifier input. The switch is activated to create a short circuit at the rectifier inputs in response to receiving an activation signal. The fault circuit is electrically connected to the switch. The fault circuit generates the activation signal in response to detecting at least one of an over voltage, an over temperature, and an over current condition of the driver circuit. The charge pump circuit provides substantially constant DC current to the fault circuit.

In yet another embodiment, a lighting system is disclosed. The lighting system includes a fluorescent ballast, a light emitting diode (LED) tube light, and a driver circuit for powering the LED tube light. The driver circuit includes an input for connection to a ballast, a rectifier, a switch, and a fault circuit. The rectifier converts AC power received from the input into DC power. The rectifier includes a rectifier input. The switch is electrically connected to the rectifier input. The switch is activated to create a short circuit at the rectifier inputs in response to receiving an activation signal. The fault circuit is electrically connected to the switch. The fault circuit generates the activation signal in response to detecting at least one of an over voltage, an over temperature, and an over current condition of the driver circuit.

DETAILED DESCRIPTION

Figure 1:
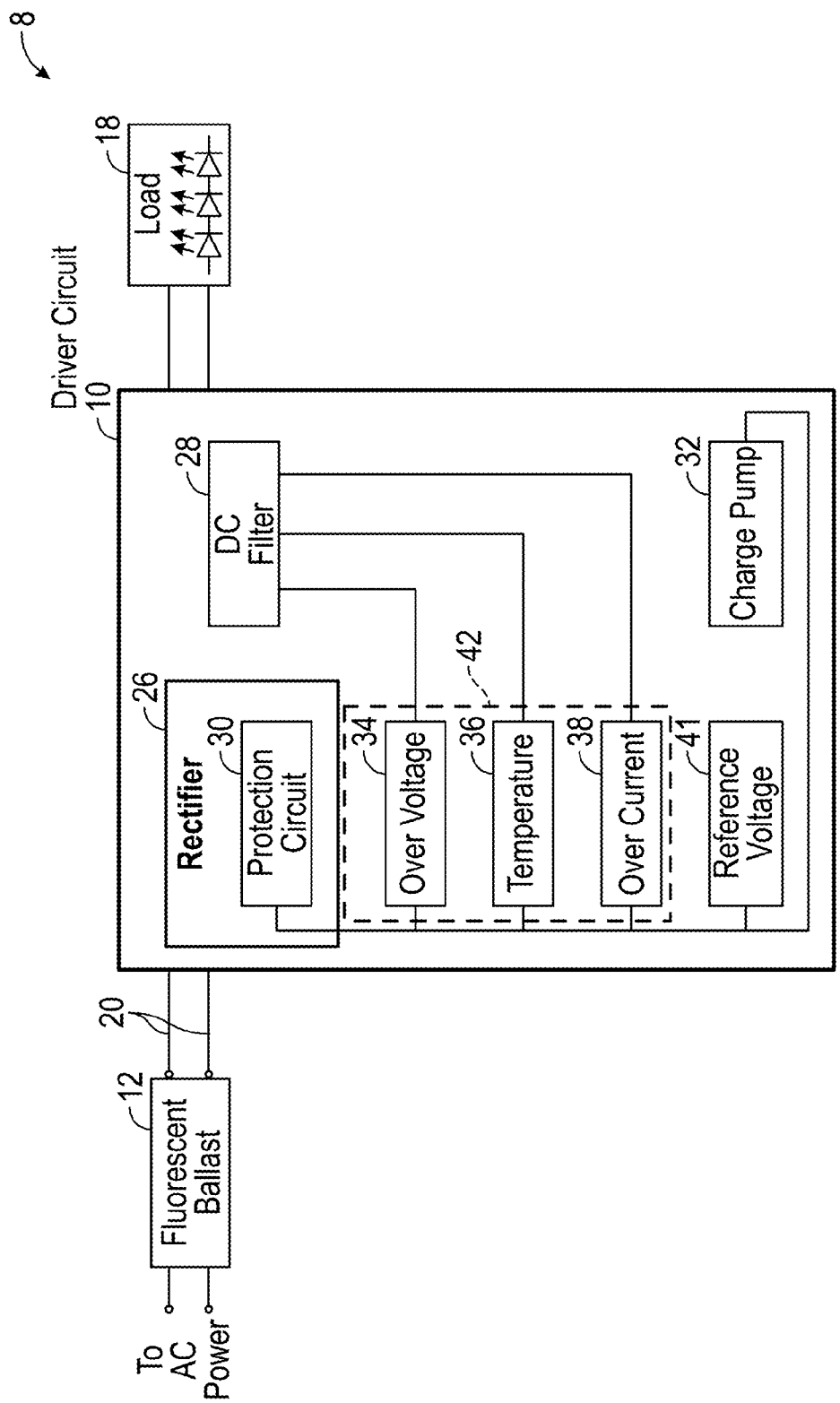
FIG. 1 is an exemplary block diagram of a lighting system including a driver circuit for providing DC current to a load.

The following detailed description will illustrate the general principles of the invention, examples of which are additionally illustrated in the accompanying drawings. In the drawings, like reference numbers indicate identical or functionally similar elements.

FIG. 1 is an exemplary block diagram of a lighting system 8 including a driver circuit 10 electrically connected to a fluorescent ballast 12. The driver circuit 10 provides DC current to a load 18. In the embodiment as illustrated, the load 18 is a light emitting diode (LED) tube light. However, it is to be understood that the disclosed driver circuit 10 may be used to power any other type of load requiring DC power as well. The driver circuit 10 may include a pair of power input lines 20 for connection to the fluorescent ballast 12. The fluorescent ballast 12 may be electrically connected to a source (not shown) of AC power such as, for example, main power lines at a nominal 120 volts AC. The fluorescent ballast 12 may be used to control and regulate voltage, current and power to a fluorescent tube light (not illustrated). As explained in greater detail below, the driver circuit 10 eliminates the need for removing the fluorescent ballast 12 of the lighting system 8 when a fluorescent tube light (not illustrated) is replaced by solid state lighting (i.e., a LED tube light).

Figure 2A:
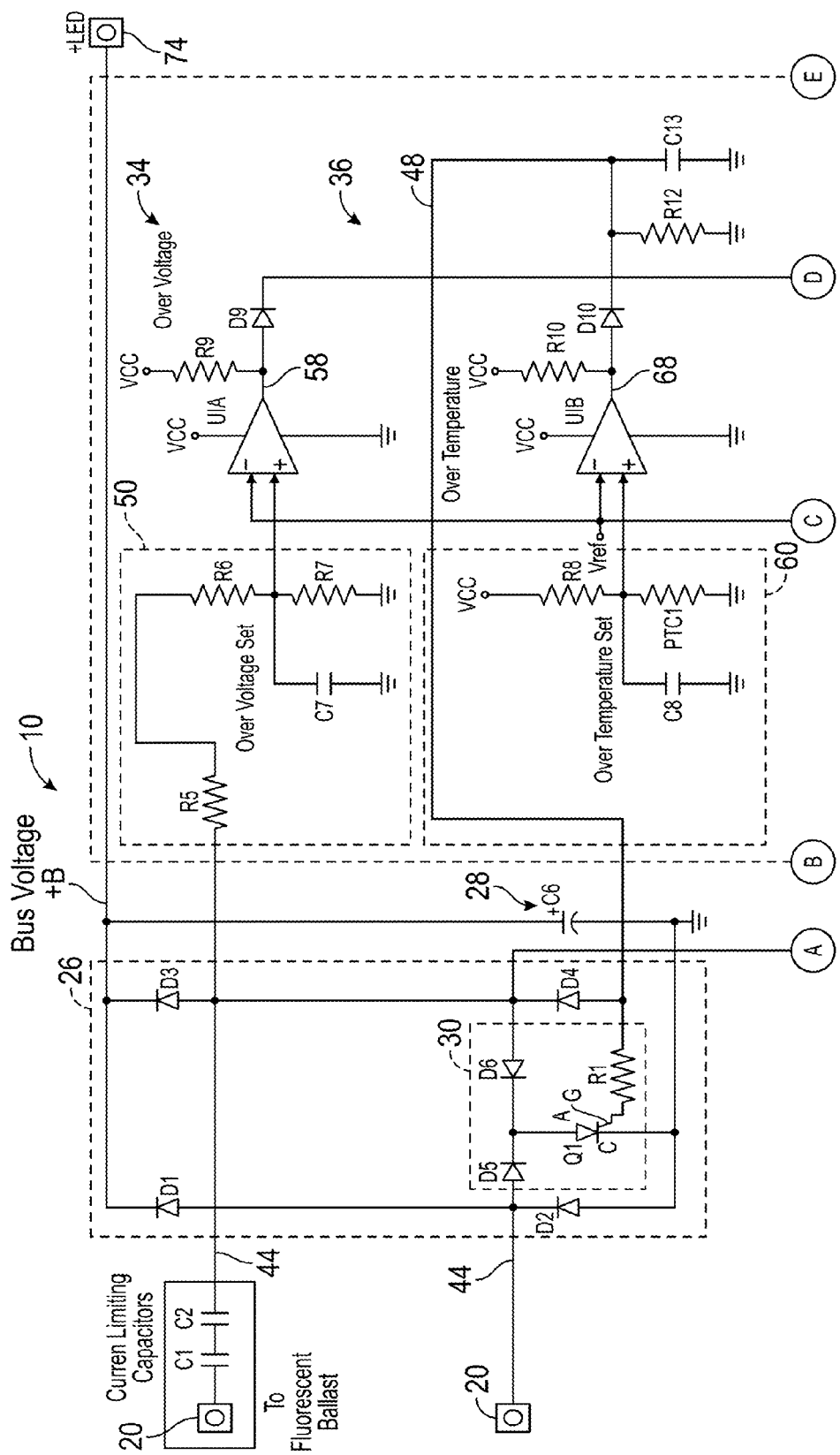
FIGS. 2A-2B are an exemplary circuit diagram of the driver circuit shown in FIG. 1, where the circuit includes a switch that is a silicon controlled rectifier (SCR)
Figure 2B:
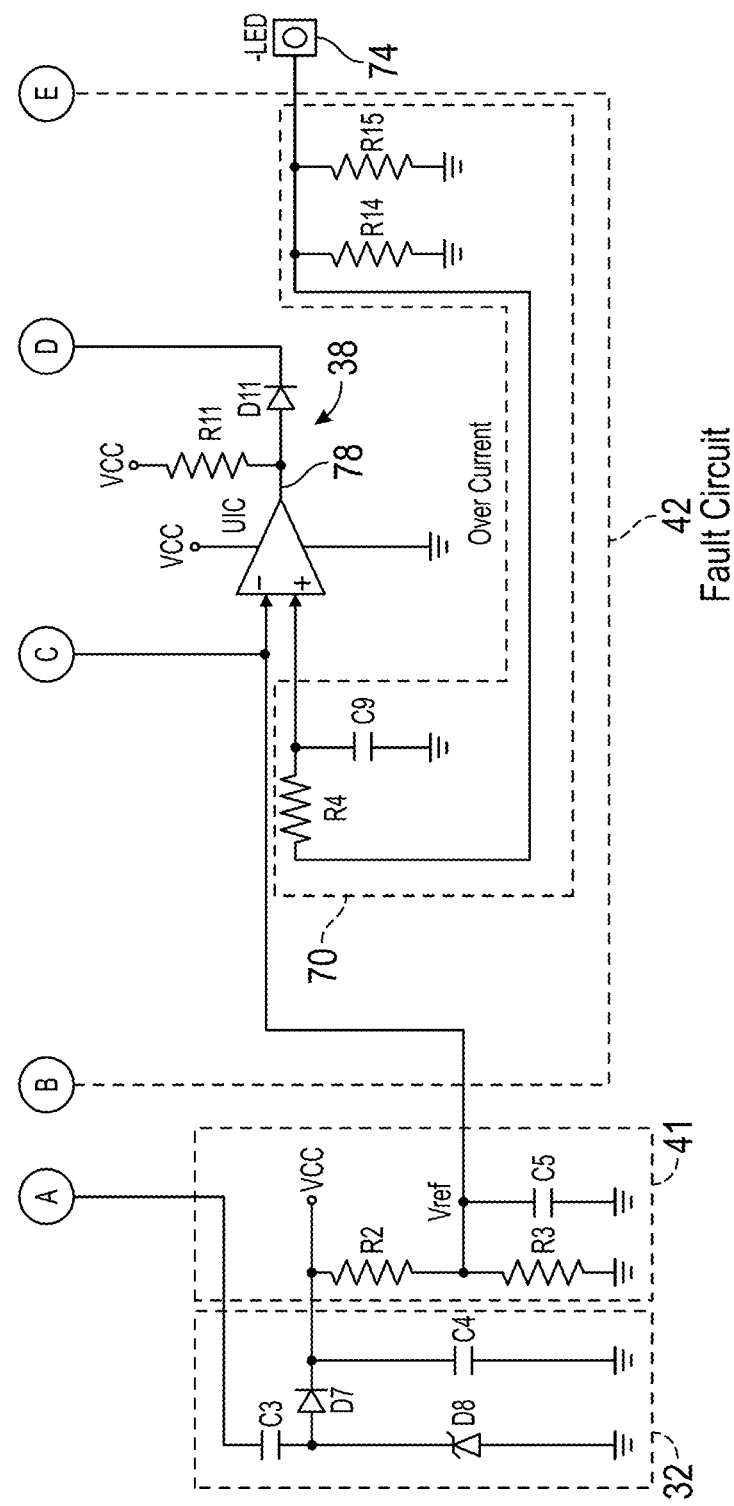

FIGS. 2A-2B are an exemplary circuit diagram of the driver circuit 10 shown in FIG. 1. Referring to FIGS. 1-2A, the driver circuit 10 includes two current limiting capacitors C1 and C2 (shown in FIG. 2A), a rectifier 26, a DC filter 28, a protection circuit 30, a charge pump circuit 32, an over voltage circuit 34, an over temperature circuit 36, and an over current circuit 38. The over voltage circuit 34, the over temperature circuit 36, and the over current circuit 38 are part of a fault circuit 42 used to turn off or stop power from flowing through the driver circuit 10 during a fault condition, which is explained in greater detail below. The rectifier 26 may be in electrical communication with the current limiting capacitors C1 and C2, and converts incoming AC power from the fluorescent ballast 12 to a pulsing DC power. Although the rectifier 26 is shown as a full wave diode bridge rectifier, those skilled in the art will readily appreciate that any type of full wave rectifier may be used as well.

The output of the rectifier 26 may be in electrical communication with the DC filter 28. In the exemplary embodiment as shown in FIGS. 2A-2B, the a DC filter 28 may include a capacitor C6. Those of ordinary skill in the art will readily appreciate that the capacitor C6 may be an electrolytic capacitor that acts as a smoothing capacitor. Specifically, the capacitor C6 may be used to smoothen or reduce the amount of ripple in the DC power provided by the rectifier 26 such that relatively steady DC power may be provided to the remaining components within the driver circuit 10.

The protection circuit 30 may include two diodes D5 and D6, a switch Q1, and a resistor R1. The switch Q1 includes an anode A and a cathode C, where the anode A is electrically connected to inputs 44 of the rectifier 26 and the diodes D5 and D6 direct current into the anode A of the switch Q1. A gate G may of the switch Q1 may be electrically connected to the fault circuit 42. As explained in greater detail below, in response to detecting a fault condition, the fault circuit 42 generates an activation signal 48 that is applied to the gate G of the switch Q1, thereby activating the switch Q1. Once the switch Q1 is activated, a short circuit condition may be created within the rectifier 26. Specifically, the switch Q1 may create a short circuit at the inputs 44 of the rectifier 26 in response to receiving the activation signal 48 from the fault circuit 42.

Figure 3A:
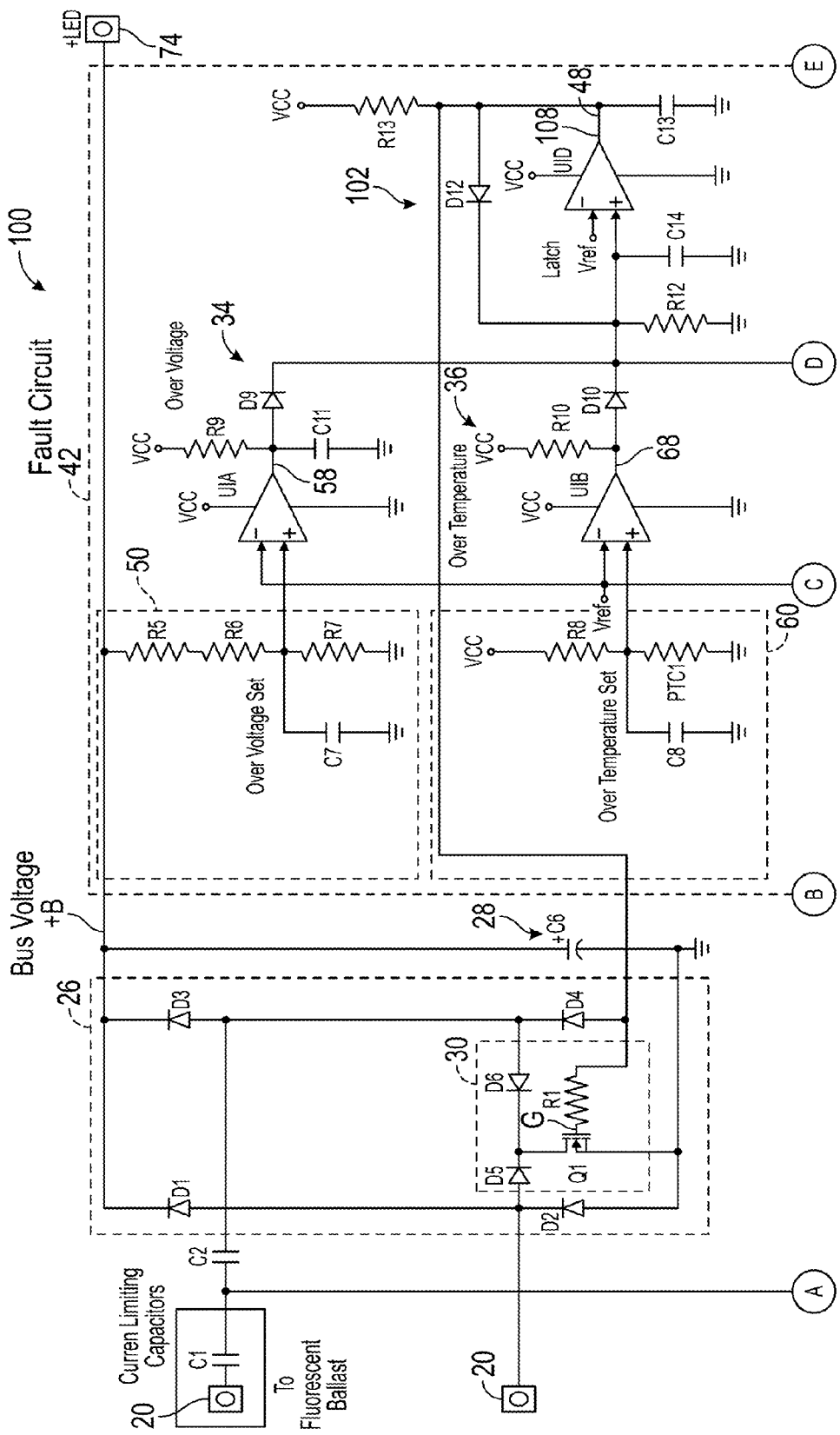
FIGS. 3A-3B are an alternative embodiment of the circuit diagram shown in FIGS. 2A-2B, where the switch shown in FIG. 2A is a metal-oxide-semiconductor field-effect transistor (MOSFET) and the driver circuit includes a latching circuit.
Figure 3B:
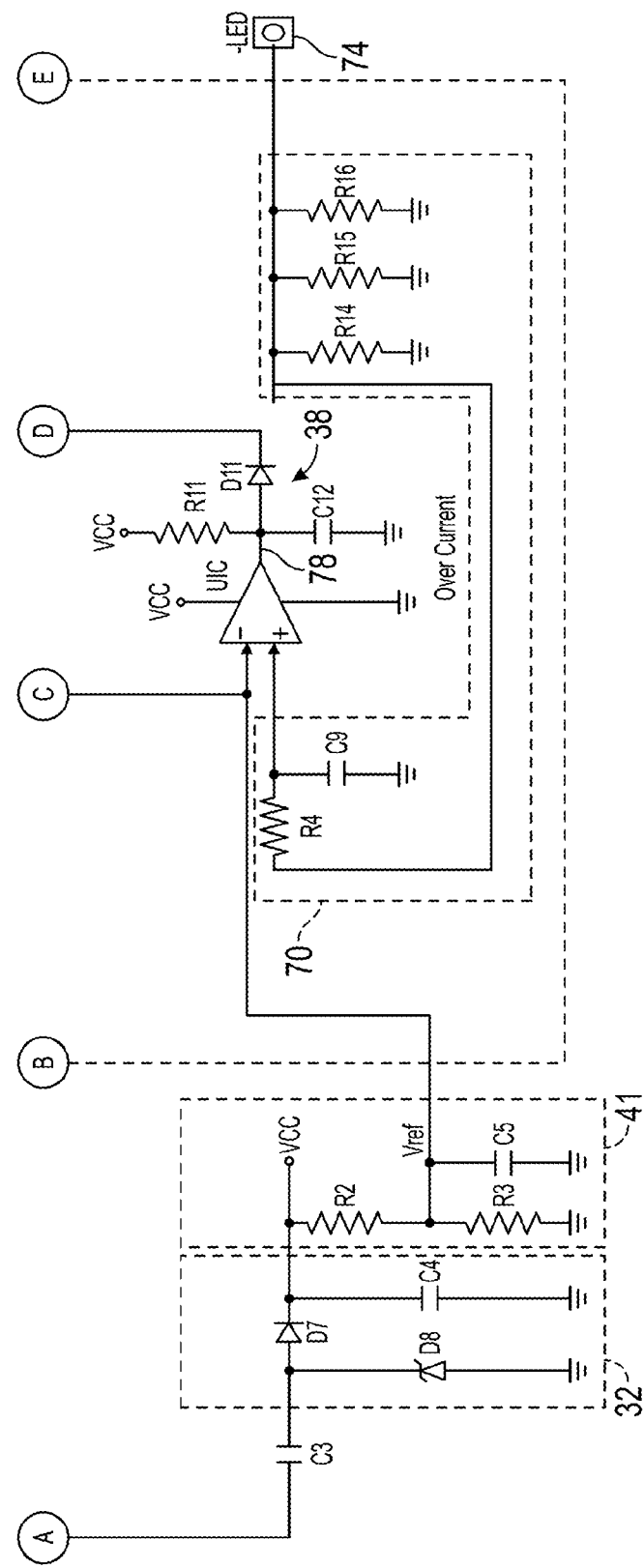

In the non-limiting embodiment as shown in FIG. 1, the switch Q1 is a silicon controlled rectifier (SCR), which is also referred to as a thyristor. However, it is to be understood that the switch Q1 is not limited to an SCR, and that other types of switching elements activated by the fault circuit 42 may be used as well. For example, in the embodiment as shown in FIGS. 3A-3B, the switch Q1 is a metal oxide semiconductor field-effect transistor (MOSFET). Referring back to FIGS. 2A-2B, those of ordinary skill in the art will appreciate that once activated, the SCR Q1 may remain activated until current flowing through the SCR Q1 drops below a respective holding current of the SCR Q1. In one non-limiting embodiment, the holding current of the SCR Q1 is about 2 mA.

Referring to FIGS. 1-2B, the charge pump circuit 32 provides substantially constant DC current to the over voltage circuit 34, the temperature circuit 36, and the over current circuit 38 of the fault circuit 42. In the embodiment as shown in FIGS. 2A-2B, the charge pump circuit 32 may include capacitors C3 and C4, a diode D7 and a zener diode D8. The capacitor C3 may be used to limit current to the zener diode D8. The zener diode D8 may be used to regulate voltage provided by the charge pump circuit 32. For example, in one approach the zener diode D8 may be used to limit the voltage provided to the fault circuit 42 to about 6.2 Volts. The diode D7 provides rectification and maintains a charge on capacitor C4. The diode D7 also blocks current flow from discharging the capacitor C4 if the voltage across the zener diode D8 drops below a power supply voltage $V_{CC}$ of the circuit 10. In one embodiment, power supply voltage $V_{CC}$ is about 5.6 Volts, however it is to be understood that this voltage is merely exemplary in nature.

The reference voltage circuit 41 includes two resistors R2 and R3 that form a voltage divider and a capacitor C5. The reference voltage circuit 41 generates a reference voltage $V_{ref}$ which is used by the fault circuit 42 as a reference value in order to detect the fault condition. The fault condition may be at least one of the following: an over voltage condition, an over temperature condition, or an over current condition of the driver circuit 10. In one exemplary embodiment the over voltage condition is triggered if a bus voltage B+ of the driver circuit 10 exceeds 400 Volts, the over temperature condition is triggered if a temperature of a driver board of the driver circuit 10 (not illustrated) exceeds 110° C., and the over current condition is triggered if current flowing out of the load 18 exceeds 350 mA.

The over voltage circuit 34 of the fault circuit 42 includes a voltage sensing circuit 50, a comparator U1A, a resistor R9 electrically connected to the power supply voltage $V_{CC}$, and a diode D9. The voltage sensing circuit 50 may include a capacitor C7 as well as resistors R5, R6, and R7. The resistors R6 and R7 create a voltage divider circuit. The bus voltage +B of the driver circuit 10 may flow from the rectifier 26, through the voltage sensing circuit 50, and is received by a positive input of the comparator U1A.

The reference voltage $V_{ref}$ generated by the reference voltage circuit 41 is received by a negative input of the comparator U1A. An output 58 of the comparator U1A goes high and generates the activation signal 48 in response to the bus voltage +B exceeding the reference voltage $V_{ref}$. The output 58 of the comparator U1A is electrically connected to the gate G of the switch Q1. The activation signal 48 turns the switch Q1 on, thereby creating a short circuit condition within the rectifier 26.

Continuing to refer to FIGS. 2A-2B, the over temperature circuit 36 includes a temperature sensing circuit 60, a comparator U1B, a resistor R10 electrically connected to the power supply voltage $V_{CC}$, and diode D10. The temperature sensing circuit 60 may include a capacitor C8 as well as a resistor R8 and a temperature sensing resistor PTC1. The resistor R8 and the temperature sensing resistor PTC1 create a voltage divider. In the embodiment as shown, the temperature sensing resistor PTC1 is a positive temperature coefficient resistor (PTC) resistor. The temperature sensing resistor PTC1 may be used to detect the temperature of the driver board (not illustrated) of the driver circuit 10.

As the temperature of the driver board increases, the resistance of the temperature sensing resistor PTC1 increases accordingly, thereby increasing voltage across the temperature sensing resistor PTC1. The voltage across the temperature sensing resistor PTC1 is received by a positive input of the comparator U1B. The reference voltage $V_{ref}$ generated by the reference voltage circuit 41 is received by a negative input of the comparator U1B. An output 58 of the comparator U1B goes high and generates the activation signal 48 in response to the voltage across the temperature sensing resistor PTC1 exceeding the reference voltage $V_{ref}$. The output 68 of the comparator U1B is electrically connected to the gate G of the switch Q1. The activation signal 48 turns the switch Q1 on, thereby creating a short circuit condition within the rectifier 26.

The over current circuit 38 includes a current sensing circuit 70, a comparator U1C, a resistor R11 electrically connected to the power supply voltage $V_{CC}$, and diode D11. The current sensing circuit 70 may include a capacitor C9 as well as resistors R4, R14, and R15. The current sensing circuit 70 may detect current flowing out of the load 18 (FIG. 1). Specifically, in the embodiment as shown in FIGS. 2A-2B, the load 18 is one or more LEDs (not illustrated). Current flowing from one of the outputs 74 of the driver circuit 10 may flow through the resistors R4, R14, and R15, and is developed into an over current voltage that is received by a positive input of the comparator U1C. The over current voltage is indicative of the current flowing from the output 74 of the driver circuit 10 (i.e., the over current voltage is based on current flowing out of the LEDs). The reference voltage $V_{ref}$ generated by the reference voltage circuit 41 is received by a negative input of the comparator U1C. An output 78 of the comparator U1C goes high and generates the activation signal 48 in response to the over current voltage exceeding the reference voltage $V_{ref}$. The output 78 of the comparator U1C is electrically connected to the gate G of the switch Q1. The activation signal 48 turns the switch Q1 on, thereby creating a short circuit condition within the rectifier 26.

In the embodiment as shown in FIGS. 2A-2B, the over voltage circuit 34, the temperature circuit 36 and the over current circuit 38 each include comparators U1A, U1B, and U1C for providing fault protection. However, those of ordinary skill in the art will appreciate that other types of circuitry, such as transistors, may be used instead. Moreover, a resistor R12 and a capacitor C13 may be electrically connected to the output 58, 68, and 78 of each respective comparator U1A, U1B, and U1C. The resistor R12 creates a voltage divider circuit with resistors R9, R10, and R11. The capacitor C13 is a filter capacitor.

FIGS. 3A-3B are an alternative embodiment of a driver circuit 100. The driver circuit 100 shown in FIGS. 3A-3B are substantially similar to the driver circuit 10 illustrated in FIGS. 2A-2B, except that the switch Q1 has been replaced with a MOSFET, the fault circuit 42 now includes a latching circuit 102, and the current sensing circuit 70 includes an extra resistor R16 located at the output 74 of the driver circuit 100. In the non-limiting embodiment as shown, the MOSFET is an n-channel MOSFET. Those of ordinary skill in the art will appreciate that a MOSFET may result in lower cost when compared to an SCR.

The latching circuit 102 may be used to hold the fault condition detected by the over voltage circuit 34, the temperature circuit 36, or the over current circuit 38. In the embodiment as shown in FIGS. 3A-3B, the latching circuit 102 includes a resistor R12, a capacitor C14, a diode D12, and a comparator U1D. The activation signal 48 generated by the over voltage circuit 34, the temperature circuit 36, or the over current circuit 38 is sent to a positive input of the comparator U1D. The reference voltage $V_{ref}$ generated by the reference voltage circuit 41 is received by a negative input of the comparator U1D. When the activation signal 48 is created (i.e., the fault condition is detected), then the voltage at the positive input of the comparator U1D exceeds the reference voltage $V_{ref}$. Accordingly, an output 108 of the comparator U1D goes high (i.e., the activation signal 48 is present at the output 108 of the comparator U1D). The output 108 of the comparator U1D is electrically connected to the gate G of the switch Q1. The activation signal 48 turns the switch Q1 on, thereby creating a short circuit condition within the rectifier 26.

Figure 4A:
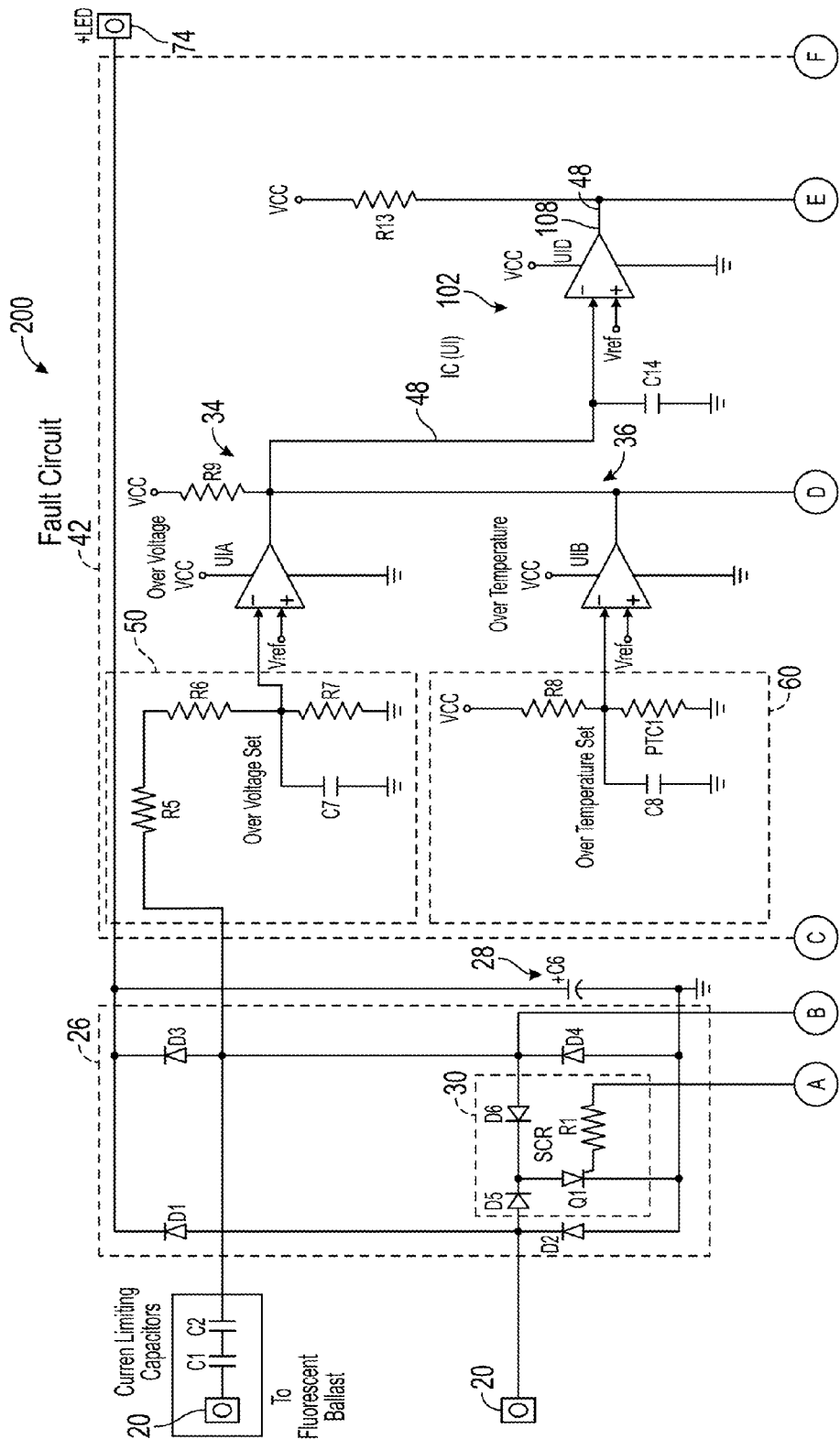
FIGS. 4A-4B are an alternative embodiment of the circuit diagram shown in FIGS. 3A-3B, where the switch is a SCR.
Figure 4B:
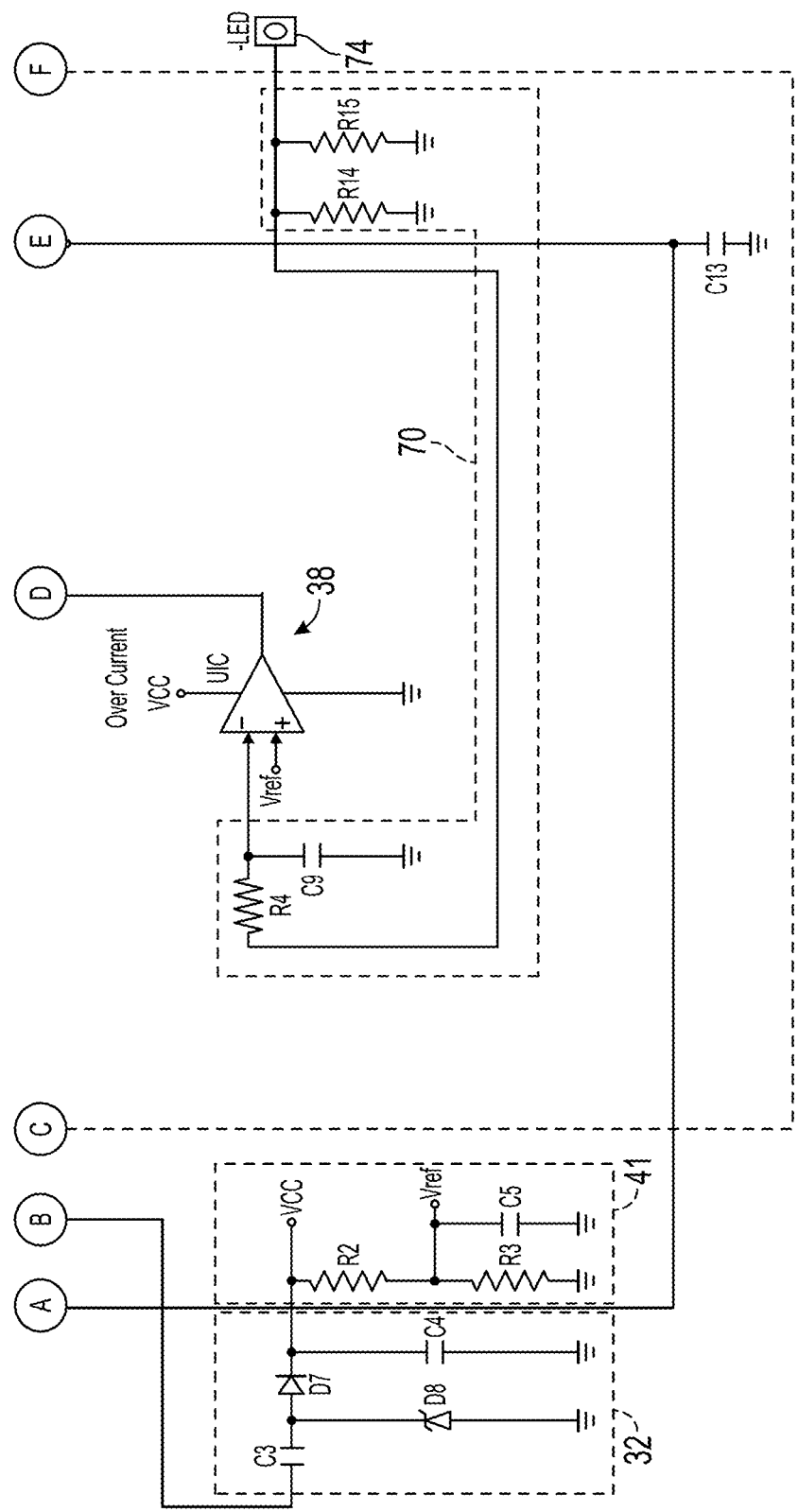

FIGS. 4A-4B are yet another embodiment of a driver circuit 200. The driver circuit 200 shown in FIGS. 4A-4B are substantially similar to the driver circuit 100 shown in FIGS. 3A-3B, except that the switch Q1 is an SCR, thereby resulting in fewer electrical components included within the driver circuit 200. Specifically, referring to FIGS. 3A, 3B, 4A and 4B, the driver circuit 200 does not include a diode electrically connected to the outputs of comparators U1A, U1B, and U1C (i.e., diodes D9, D10, and D11). The driver circuit 200 also does not include a capacitor electrically connected to the outputs of comparators U1A, U1B, and U1C (i.e., capacitors C11, C10, and C12). The driver circuit 200 also includes only a single resistor R9 electrically connected to the outputs of comparators U1A, U1B, and U1C (resistors R10 and R11 have been omitted from the driver circuit 200). Moreover, the resistor R16 of the current sensing circuit 70 has been omitted in the driver circuit 200. The latching circuit 102 of the driver circuit 200 also does not include a resistor 12 or the diode D12.

Those of ordinary skill in the art will appreciate that although MOSFETs usually result in lower cost, utilizing an SCR for the switch Q1 may result in fewer components, which in turn may result in decreased complexity and lower overall costs. Furthermore, those of ordinary skill in the art will also appreciate that a non-sensitive gate SCR may be used within the driver circuit 200 as well in order to reduce component costs.

The disclosed circuit 10 as illustrated in FIGS. 1-4B and described above provides a relatively low-cost, precise approach for driving LED lighting, and also eliminates the need for removing the fluorescent ballast in the event a fluorescent tube light is replaced by solid state lighting, such as an LED tube light. Specifically, the high frequency rectification and fault protection provided by the disclosed circuit 10 eliminates the need to remove the fluorescent ballast and provide a replacement driver.

While the forms of apparatus and methods herein described constitute preferred embodiments of this invention, it is to be understood that the invention is not limited to these precise forms of apparatus and methods, and the changes may be made therein without departing from the scope of the invention.

What is claimed is:

1. A driver circuit for powering a load, comprising:
an input for connection to a ballast;
a rectifier for converting AC power received from the input into DC power, the rectifier including a rectifier input;
a switch electrically connected to the rectifier input, wherein the switch is activated to create a short circuit at the rectifier inputs in response to receiving an activation signal;
a fault circuit electrically connected to the switch, wherein the fault circuit generates the activation signal in response to detecting at least one of an over voltage, an over temperature, and an over current condition of the driver circuit; and
a charge pump circuit for providing substantially constant DC current to the fault circuit, the charge pump circuit including a first capacitor and a zener diode, wherein the first capacitor limits current to the zener diode and the zener diode limits a voltage provided to the fault circuit.

2. The driver circuit recited in claim 1, wherein the charge pump circuit includes a second capacitor and a diode, wherein the diode provides rectification and maintains a charge on the second capacitor.

3. The driver circuit recited in claim 1, wherein the switch is a silicon controlled rectifier (SCR).

4. The driver circuit recited in claim 1, wherein the switch is a metal-oxide-semiconductor field-effect transistor (MOSFET).

5. The driver circuit recited in claim 1, comprising a latching circuit for holding a fault condition detected by the fault circuit.

6. A driver circuit for powering a light emitting diode (LED) tube light, comprising:
an input for connection to a ballast;
a rectifier for converting AC power received from the input into DC power, the rectifier including a rectifier input;

a switch electrically connected to the rectifier input, wherein the switch is activated to create a short circuit at the rectifier inputs in response to receiving an activation signal;

a fault circuit electrically connected to the switch, wherein the fault circuit generates the activation signal in response to detecting at least one of an over voltage, an over temperature, and an over current condition of the driver circuit; and a charge pump circuit for providing substantially constant DC current to the fault circuit, wherein the charge pump circuit includes a first capacitor and a zener diode, wherein the first capacitor limits current to the zener diode and the zener diode limits a voltage provided to the fault circuit.

7. The driver circuit recited in claim 6, wherein the charge pump circuit includes a second capacitor and a diode, wherein the diode provides rectification and maintains a charge on the second capacitor.

8. The driver circuit recited in claim 6, comprising a reference voltage circuit generating a reference voltage, wherein the reference voltage is used by the fault circuit as a reference value to determine the over voltage, the over temperature, and the over current condition of the driver circuit.

9. The driver circuit recited in claim 8, wherein the fault circuit compares a bus voltage of the driver circuit with the reference voltage, and generates the activation signal in response to the bus voltage exceeding the reference voltage.

10. The driver circuit recited in claim 8, wherein the fault circuit includes a temperature sensing circuit for detecting a temperature of a driver board of the driver circuit.

11. The driver circuit recited in claim 10, wherein the fault circuit generates the activation signal in response to a voltage across the temperature sensing circuit exceeding the reference voltage.

12. The driver circuit recited in claim 8, comprising a current sensing circuit for detecting current flowing out of the LED tube light and creating an over current voltage based on the current flowing out of the LED tube light.

13. The driver circuit recited in claim 12, wherein the fault circuit generates the activation signal in response to the over current voltage exceeding the reference voltage.

14. A lighting system, comprising:
a fluorescent ballast;
a light emitting diode (LED) tube light; and
a driver circuit for powering the LED tube light, the driver circuit comprising:
an input for connection to the fluorescent ballast;
a rectifier for converting AC power received from the input into DC power, the rectifier including a rectifier input;
a switch electrically connected to the rectifier input, wherein the switch is activated to create a short circuit at the rectifier inputs in response to receiving an activation signal;
a fault circuit electrically connected to the switch, wherein the fault circuit generates the activation signal in response to detecting at least one of an over voltage, an over temperature, and an over current condition of the driver circuit;
a charge pump circuit for providing substantially constant DC current to the fault circuit; and
a reference voltage circuit generating a reference voltage, wherein the reference voltage is used by the fault circuit as a reference value to determine the over voltage, the over temperature, and the over current condition of the driver circuit.

15. The lighting system recited in claim 14, wherein the fault circuit compares a bus voltage of the driver circuit with the reference voltage, and generates the activation signal in response to the bus voltage exceeding the reference voltage.

16. The lighting system recited in claim 14, wherein the fault circuit includes a temperature sensing circuit for detecting a temperature of a driver board of the driver circuit.

17. The lighting system recited in claim 16, wherein the fault circuit generates the activation signal in response to a voltage across the temperature sensing circuit exceeding the reference voltage.

18. The lighting system recited in claim 14, comprising a current sensing circuit for detecting current flowing out of the LED tube light and creating an over current voltage based on the current flowing out of the LED tube light.

19. The lighting system recited in claim 18, wherein the fault circuit generates the activation signal in response to the over current voltage exceeding the reference voltage.

20. A driver circuit for powering a load, comprising:
an input for connection to a ballast;
a rectifier for converting AC power received from the input into DC power, the rectifier including a rectifier input;
a switch electrically connected to the rectifier input, wherein the switch is activated to create a short circuit at the rectifier inputs in response to receiving an activation signal;
a fault circuit electrically connected to the switch, wherein the fault circuit generates the activation signal in response to detecting at least one of an over voltage, an over temperature, and an over current condition of the driver circuit; and
a reference voltage circuit generating a reference voltage, wherein the reference voltage is used by the fault circuit as a reference value to determine the over voltage, the over temperature, and the over current condition of the driver circuit.

21. The driver circuit recited in claim 20, wherein the fault circuit compares a bus voltage of the driver circuit with the reference voltage, and generates the activation signal in response to the bus voltage exceeding the reference voltage.

22. The driver circuit recited in claim 20, wherein the fault circuit includes a temperature sensing circuit for detecting a temperature of a driver board of the driver circuit.

23. The driver circuit recited in claim 22, wherein the fault circuit generates the activation signal in response to a voltage across the temperature sensing circuit exceeding the reference voltage.

24. The driver circuit recited in claim 20, comprising a current sensing circuit for detecting current flowing out of the load and creating an over current voltage based on the current flowing out of the load.

25. The driver circuit recited in claim 24, wherein the fault circuit generates the activation signal in response to the over current voltage exceeding the reference voltage.

* * * * *